US006229527B1

(12) United States Patent
Shearn

(10) Patent No.: US 6,229,527 B1
(45) Date of Patent: May 8, 2001

(54) COMPUTER POINTING DEVICE AND METHOD OF USE

(76) Inventor: Patrick M. Shearn, 1333 26th St., Santa Monica, CA (US) 90404

(*) Notice: Subject to any disclaimer, the term of this patent is extended or adjusted under 35 U.S.C. 154(b) by 0 days.

(21) Appl. No.: 09/185,344

(22) Filed: Nov. 3, 1998

Related U.S. Application Data

(63) Continuation-in-part of application No. 08/805,122, filed on Feb. 24, 1997.

(51) Int. Cl.[7] ........................................... G09G 5/08
(52) U.S. Cl. ............................... 345/163; 345/157
(58) Field of Search ................... 345/163, 167, 345/161, 168, 157, 179, 172; 341/22

(56) References Cited

U.S. PATENT DOCUMENTS

| 4,142,244 | * | 2/1979 | Garziera et al. | 345/172 |
| 5,122,654 | * | 6/1992 | Koh et al. | 345/163 |
| 5,731,807 | * | 3/1998 | Feierbach | 345/163 |
| 6,107,990 | * | 8/2000 | Fleming, III | 345/168 |

* cited by examiner

*Primary Examiner*—Richard Hjerpe
*Assistant Examiner*—Benjamin D. Bowers
(74) *Attorney, Agent, or Firm*—Ted Masters

(57) ABSTRACT

A hand operated computer pointing device (120) such as a "mouse" includes at least one control button (130) which is selectively positionable to a plurality of desired locations on the surface (127) of the body (122) of the computer point device (120). A user may selectively position the control button(s) (130) to any desired location upon the surface (127) of the body (122) in order to (a) best fit the hand (500) and fingers of the user, and (b) to reduce biomechanical stress. The body of the computer pointing device (120) may be of conventional firm construction (122), or alternatively may be moldable (22) by the user into a plurality of desired shapes.

5 Claims, 7 Drawing Sheets

COMPUTER POINTING DEVICE AND METHOD OF USE

CROSS-REFERENCE TO RELATED APPLICATION

This application is a Continuation-in-Part of application Ser. No. 08/805,122, filed Feb. 24, 1997, the specification of which is included herein by reference.

TECHNICAL FIELD

The present invention pertains to hand operated computer pointing devices, such as a "mouse", and in particular to a computer pointing device which has movable control buttons which, can be positioned by a user to a plurality of desired locations upon the surface of the computer pointing device.

BACKGROUND ART

Computer pointing devices for positioning a cursor and entering commands into a computer are well known in the art. These devices typically include a body or top portion upon which the user's hand rests, two or three depressible control buttons integral with the body, and a bottom portion or base which contains a motion sensing device and electronics. Some computer pointing devices include a rotatable ball, wherein electronic encoders sense rotation of the ball and generate a signal indicative of the ball's rotation to control movement of a cursor on a computer screen. The rotatable ball extends from the bottom surface of the computer pointing device, and contacts a work surface such as a table or mouse pad. The movement of the computer pointing device across the work surface causes rotation of the ball, and therefore movement of the cursor. Other computer pointing devices employ optical encoders that track the motion of the pointing device over a work surface and generate a signal indicative of the pointing devices' position which is electronically coupled to the computer screen cursor.

After the cursor is appropriately positioned, the control buttons, sometimes referred to as keys or switches, permit the user to enter various commands into the computer. For example, depressing a control button may open an application program, highlight text in a word processing program, fire a weapon in a game, pull down a menu, open or close a file, and the like.

Many of the currently available computer pointing devices have disadvantages however. First, the computer pointing device may not fit the hand of the particular user, and therefore may cause discomfort or difficulty of operation. Additionally, prolonged use of the computer pointing device can cause biomechanical stress to the user. These factors may manifest themselves in several ways, some examples being, the hand or arm of the user may feel tired or cramped after grasping and operating the computer pointing device for any length of time. Or more seriously, repetitive stress injury (RSI), a cumulative trauma disorder stemming from prolonged repetitive, forceful, or awkward hand movements, may be experienced, with its' resultant damage to the muscles, tendons, and nerves of the neck, shoulder, forearm, and hand.

A need therefore exists for a computer pointing device which will both fit the hand of the particular user, and minimize any biomechanical stress experienced by the user. U.S. Pat. No. 5,731,807 discloses a computer pointing device which assists in realizing these two goals. This patent discloses an apparatus and method for customizing the shape of a computer mouse to an individual's hand. The device uses a pliable body, typically a pliable body with an elastomer skin enclosing a pliable material. The pliable body is shaped into a customized configuration. A bonding agent may be used with the pliable material to form a hardened, customized configuration. The pliable body is connected to an electonic base assembly, which includes electronic circuitry to generate a mouse output signal for application to a computer. U.S. Pat. Nos. 5,570,112, 5,576,733, 5,581,277, and 5,648,798 illustrate other ergonomic computer pointing devices.

DISCLOSURE OF INVENTION

The present invention is directed to a computer pointing device which has a moldable body wherein a user can mold or form the body into a plurality of shapes. This novel feature permits the user to both (1) form the body into a shape that is easier and most comfortable to use, and (2) during a work period, periodically change the body shape to lessen biomechanical stress. Additionally, the present invention includes selectively positionable control buttons which can also be placed to fit the user, and periodically moved to lessen biomechanical stress. These design features provide an ergonomic computer pointing device which allows the user to change both the body shape and the location of the control buttons over the course of a work period, thus reducing overall biomechanical stress, while still maintaining the accuracy with which the computer pointing device is controlled and actuated.

In accordance with a preferred embodiment of the invention, a computer pointing device has a moldable body connected to a base. The moldable body can be molded or formed by a user into a plurality of shapes.

In accordance with an important aspect of the invention, the moldable body includes a material selected from the group consisting of silicone putty, wax, and clay.

In accordance with an important feature of the invention, the moldable body includes a granular or powdered material contained with a flexible covering.

In accordance with another important aspect of the invention, the moldable body has an outer surface having at least one control button disposed thereon.

In accordance with another important feature of the invention, the control button is selectively positionable on the outer surface.

In accordance with another important aspect of the invention, Velcro™ is utilized to hold the control button in place on the surface of the moldable body.

In accordance with another preferred embodiment of the invention, a computer pointing device has a body having an outer surface. At least one control button is disposed upon the surface. The control button is selectively positionable to any one of an unlimited plurality of desired locations upon the surface.

In accordance with an important aspect of the invention, a base having electronic circuitry is connected to the body. A conductor such as a wire connects the control button to the electronic circuitry and forms a tether therebetween.

In accordance with an important feature of the invention, the control button electromagnetically communicates with the electronic circuitry rather than being directly connected by a conductor.

In accordance with another important aspect of the invention, the body can either be of conventional firm construction or can be moldable.

In accordance with another important feature of the invention, a retaining means holds the control button in the desired location upon the surface of the body of the computer pointing device.

In accordance with an aspect of the invention, the retaining means includes a hook and loop-type fastener.

Other features and advantages of the present invention will become apparent from the following detailed description, taken in conjunction with the accompanying drawings, which illustrate, by way of example, the principles of the invention.

MODES FOR CARRYING OUT THE INVENTION

Figure 1:
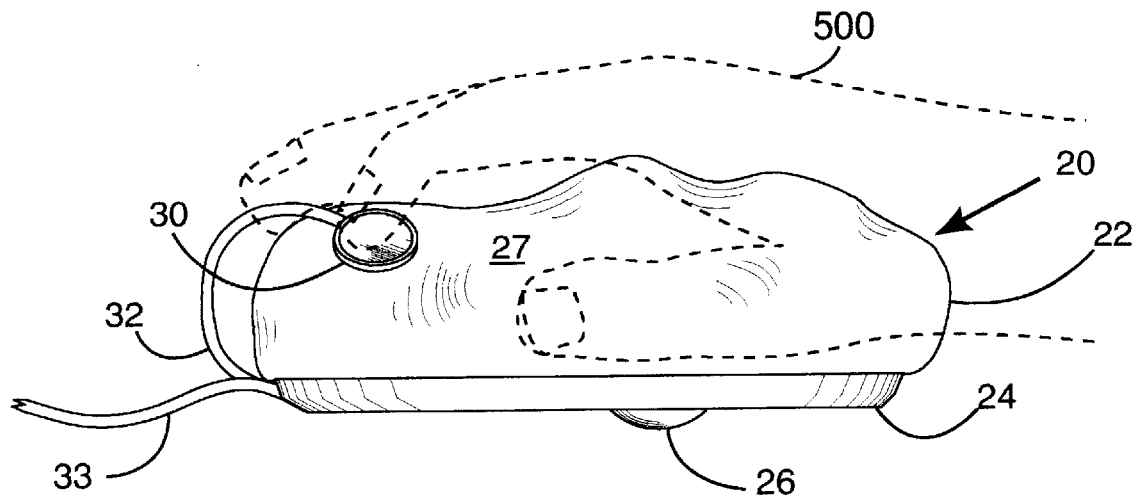
FIG. 1 is a side elevation view of a computer pointing device in accordance with the present invention showing the moldable body in a first shape.
Figure 2:
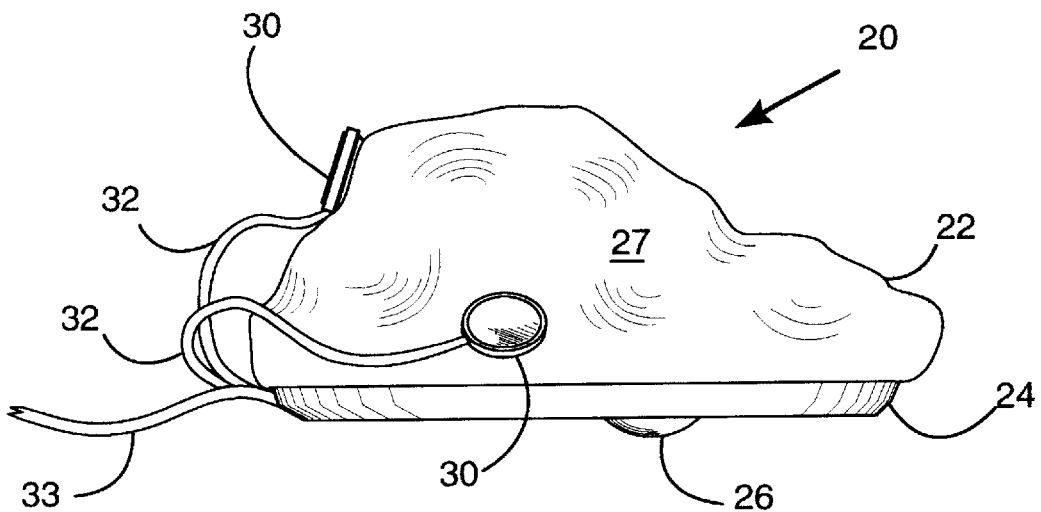
FIG. 2 is a side elevation view of the computer pointing device showing the moldable body in a second shape.

Referring initially to FIGS. 1 and 2, there are illustrated side elevation views of a computer pointing device in accordance with the present invention, generally designated as 20. Computer point device 20 includes a moldable body 22 connected to a base 24. Base 24 includes a motion sensing device and electronic circuitry (not shown), which are well known in the computing art. In the embodiment shown, the motion sensing device includes a rotatable (rollable) ball 26 whose motion is sensed and electronically coupled to a computer screen by means also well known in the computing art. Base 24 could be a modified version of a commercially available unit, to which the moldable body 22 of the present invention is attached. In FIG. 1, moldable body 22 has been molded (formed) by a user into a first shape. The user's hand 500 is shown resting upon the moldable body 22 in a ready-for-use position. In FIG. 2, moldable body 22 has been molded into a second shape. It may be appreciated that moldable body 22 can be molded and remolded into an unlimited plurality of shapes to best suit the needs of the user by (a) allowing the moldable body 22 to properly fit the hand 500 of the user, and (b) allowing the moldable body 22 o be changed to a new shape to reduce biomechanical stress. Moldable body 22 has an outer surface 27.

Moldable body 22 can be fabricated from virtually any material which can be molded by the human hand, and when so molded, will substantially retain its shape during use, until such time as remolding is desired. Some possible materials include silicone putty, wax, and clay. Since computers are typically operated at or near normal room temperature (e.g. 72°), the selected material should preferable exhibit the stated molding and retaining properties at that temperature. One useful type of silicone putty is from the chemical family "organopolysiloxanes", goes by the name "Air Putty #NC52420", and may be obtained from North Coast Medical Supply, 187 Stauffer Blvd., San Jose, Calif. 95125-1042, (408) 283-1900.

Figure 3:
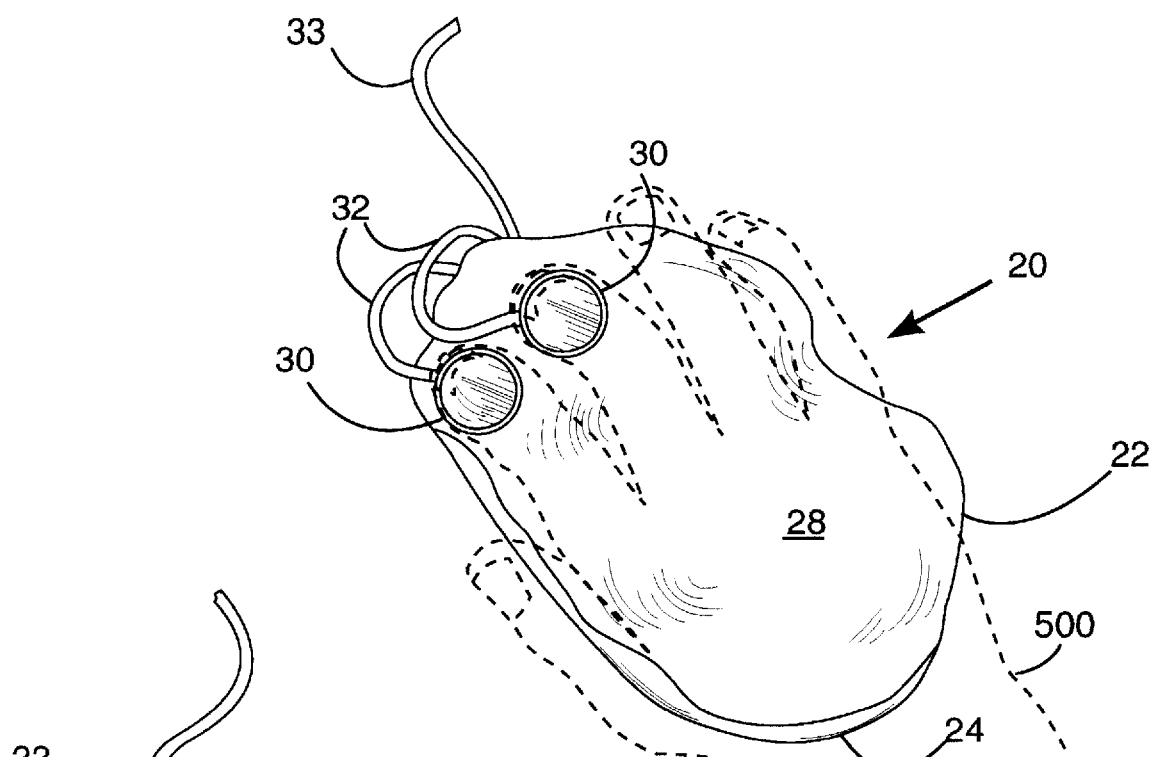
FIG. 3 is a perspective view of a second embodiment of the computer pointing device showing two control buttons in first selected locations.
Figure 4:
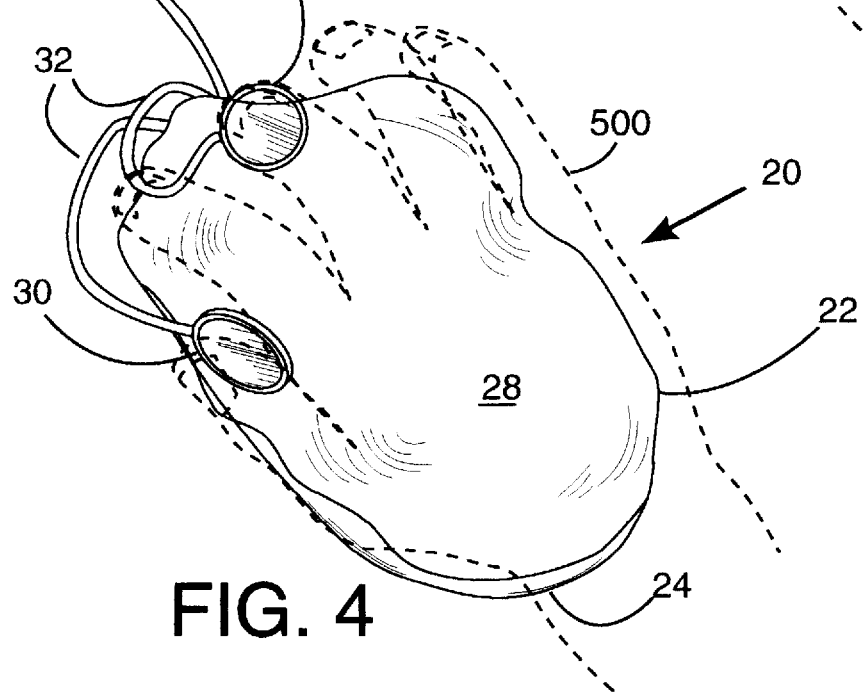
FIG. 4 is a perspective view of a second embodiment of the computer pointing device showing the two control buttons in second selected locations.

FIGS. 3 and 4, are perspective views of a second embodiment of computer pointing device 20. In this embodiment, moldable body 22 is fabricated from a material contained within a flexible covering (skin) 28 such as cloth, rubber, latex, spandex, plastic, and the like. That is, covering 28 surrounds and contains the material much as would a bag or pouch. In this embodiment, covering 28 forms the outer surface 27 (refer to FIGS. 1 and 2) of moldable body 22. The enclosed material could include granular or powdered compounds, or combinations of compounds, such as sand, plastic pellets, baking soda, corn starch, and the like. One advantage of the granular or powdered materials, is that their molding properties are much less sensitive to temperature variations.

In another preferred embodiment, covering 28 is also utilized as a covering for the previously mentioned solid moldable materials such as silicone, wax, etc shown in FIGS. 1 and 2. In this instance, covering 28 provides a barrier against loose particulate contamination of the moldable material, protects the user's hands, prevents the oils of the user's hand from contaminating the moldable material, prevents the loss of moldable material, and provides a structure onto which control buttons 30 may be conveniently positioned and repositioned.

Continuing with FIGS. 3 and 4, moldable body 22 has an outer surface 27 which is formed by covering 28. At least one control button 30 is disposed on outer surface 27 (formed by covering 28). Two control buttons 30 are shown, however any number, such as three, could also be employed depending upon design requirements. In a preferred embodiment the control buttons are NKK brand Model #JF15CP2D, and are available from Electric Switches Incorporated, 2478 Fletcher Dr., Los Angeles, Calif. 90039.

A conductor (tether) 32 connects control button 30 to base 24. In a preferred embodiment, conductor 32 comprises a two-wire conductor which transmits a switch closure from control button 30 to the electronics housed in base 24. As in any conventional computer pointing device, wire 33 connects the electronics of base 24 to a computer. Control button 30 is selectively positionable on surface 27 formed by covering 28. In FIG. 4, control buttons 30 have been positioned to different selected locations to best serve the needs of the user. A particularly useful feature of the present invention resides in the fact that control buttons 30 may be selectively positioned by the user so that they may be operated by any finger or even the thumb as shown in FIG. 4. This is in sharp contrast to most conventional pointing devices wherein the mouse design essentially restricts control button operation to the index, middle, and perhaps fourth fingers. The control buttons 30 can also be repositioned upon the surface 27 to reduce biomechanical stress.

Figure 5:
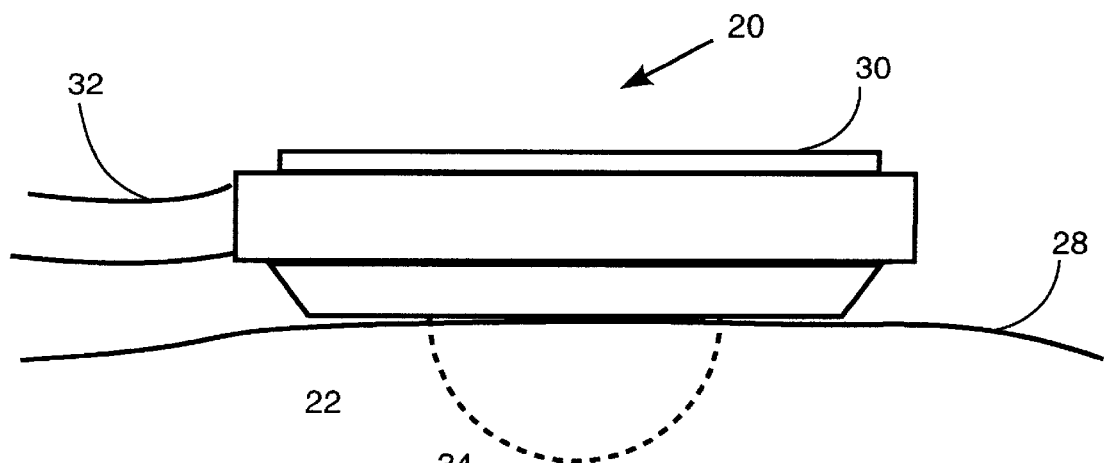
FIG. 5 is an enlarged edge view of a control button showing a protuberance for embedment into the moldable body.
Figure 6:
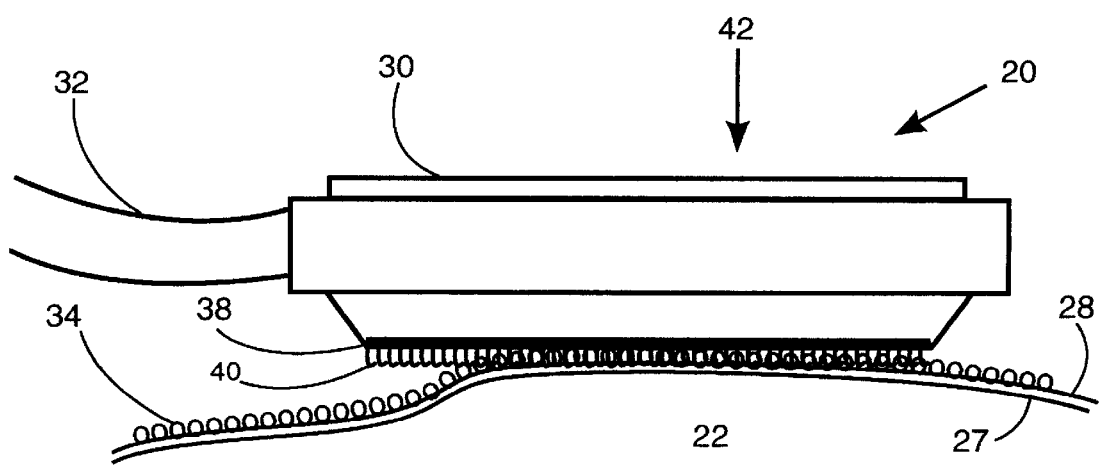
FIG. 6 is an enlarged edge view of a control button and moldable body showing a hook and loop retaining means.

A retaining means holds control button 30 in the selected location on surface 27. FIG. 5 is an enlarged edge view of control button 30. In this embodiment, the retaining means includes control button 30 having at least one protuberance 34 for embedment into body 22 through surface 27 which may include covering 28. After embedment, control button 30 can be extracted and repositioned at another location on surface 27. Referring to FIG. 6, in a preferred embodiment, the retaining means includes surface 27 having a first covering 28 having either a plurality of loops 34 or hooks 40, and control button 30 having a bottom having a second covering 38 which has a plurality of the other of loops 34 and hooks 40. When control button 30 is placed on first covering 28 in direction 42, hooks 40 engage loops 34 thereby holding control button 30 in the desired selected location on first covering. A product such as Velcro™ could serve this purpose. In a preferred embodiment the moldable material is cornstarch which is contained within a latex skin to form moldable body 22. Control buttons 30 having protuberances 34 could be embedded in the skin, or alternatively, an additional covering layer of loop-fabric would be added for the hook and loop type control button 30 attachment.

Figure 7:
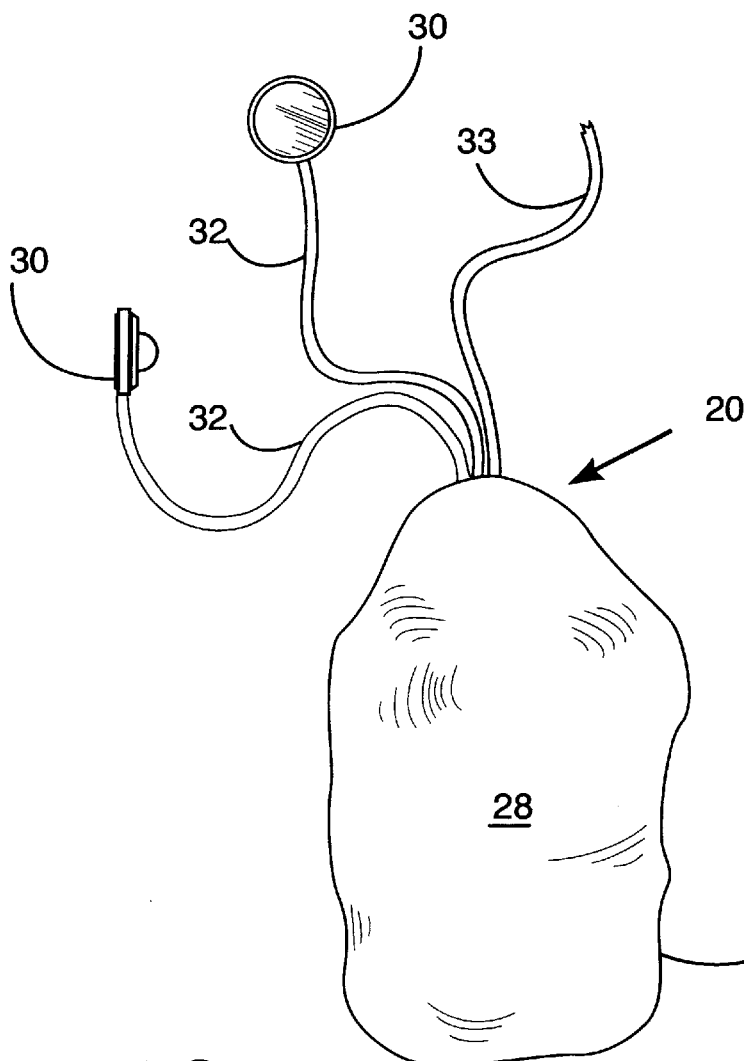
FIG. 7 is a top plan view of the computer pointing device.

FIG. 7 is a top plan view of the computer pointing device 20.

Figure 8:
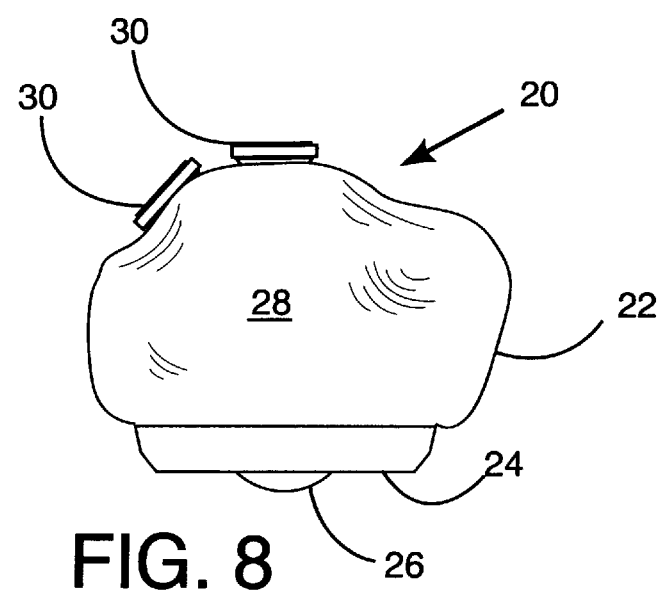
FIG. 8 is a rear elevation view of the computer pointing device.

FIG. 8 is a rear elevation view of the computer pointing device 20.

Figure 9:
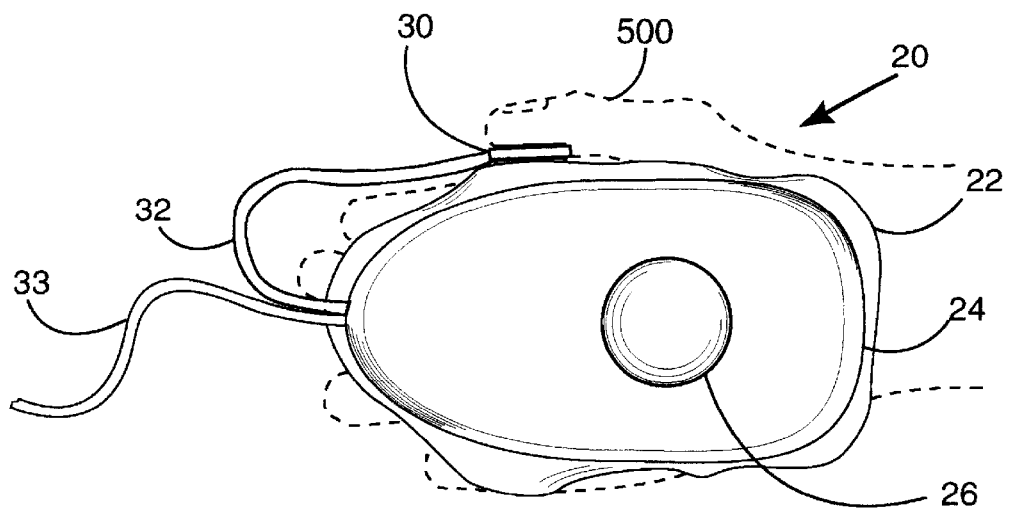
FIG. 9 is a bottom plan view of the computer pointing device.

FIG. 9 is a bottom plan view of the computer pointing device 20.

Figure 10:
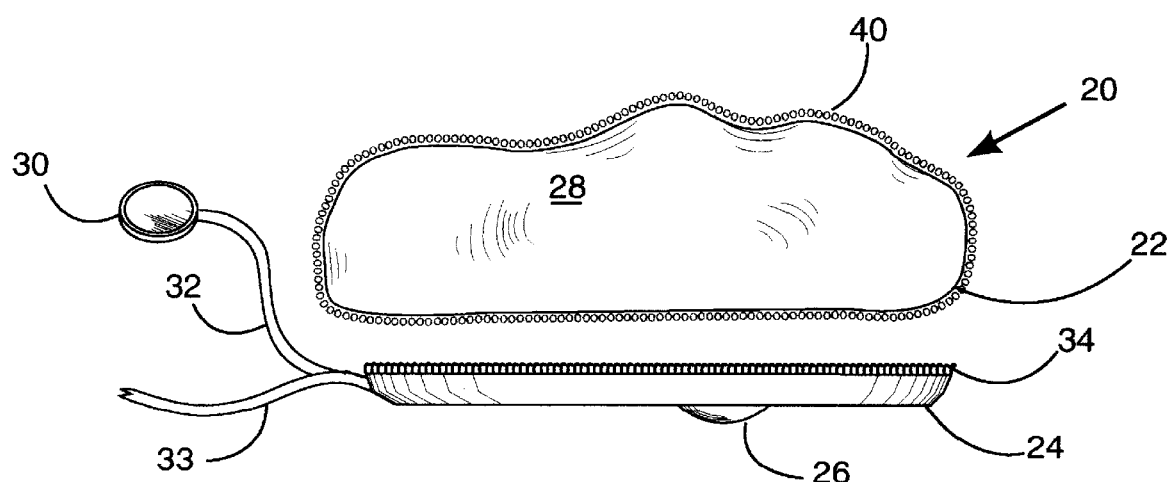
FIG. 10 is a side elevation view showing a method of attaching the moldable body to the base.

With regard to connecting moldable body 22 to base 24, several options are available. A preferred embodiment is shown in FIG. 10. In this embodiment moldable body 22 is a bag made of a rubber skin having a fabric covering 28 containing a plurality of loops 40. The top of the base 24 is covered with a plurality of hooks 34. In this way the moldable body 22 can be easily positioned on top of the base 24, and can be replaced and cleaned as necessary. Alternatively, for a solid or fabric covered moldable body 22, base 24 could have upwardly emanating protuberances that would simply embed into the moldable body 22, thereby holding the body 22 in place. Another possibility could incorporate a rigid body base component on the interior of the flexible covering 28 of the moldable material that would capture the edges of the flexible covering 28 and would connect to the base 24 creating an enclosure for the moldable material. Other preferred design features of the present invention are:

1. The center of the rotatable ball 26 or optical encoder being located near a grip axis to provide a feeling of control and responsiveness.

2. A sufficient width across an arc of the computer pointing device 20 to support the weight of the user's hand.

3. A relatively narrow width of the front of the base 24 to allow accurate control.

4. Rounded edges on all rigid components to minimize injury to the user's hand.

5. A base 24 shape that allows the user to grasp the computer pointing device 20 with either the right or left hand comfortably.

6. Sizing of the control buttons 30 and base 24 to ensure adequate contact surfaces for the user's fingers.

To use the computer pointing device 20, a user first molds body 22 into a first desired shape to fit the user's hand 500. After a period of operational use, the user molds body 22 into a second desired shape in order to relieve biomechanical stress. The remolding process is repeated as many times as desired. The user also selectively positions the control button(s) 30 to a first position on the surface 27 of moldable body 22. In a preferred embodiment surface 27 includes a flexible covering 28. After a period of operational use, the user repositions control button 30 to a second position on surface 27.

Moldable body 22 can be attached to a modified commercially available base (24), which includes a motion sensing device and electronics.

Figure 11:
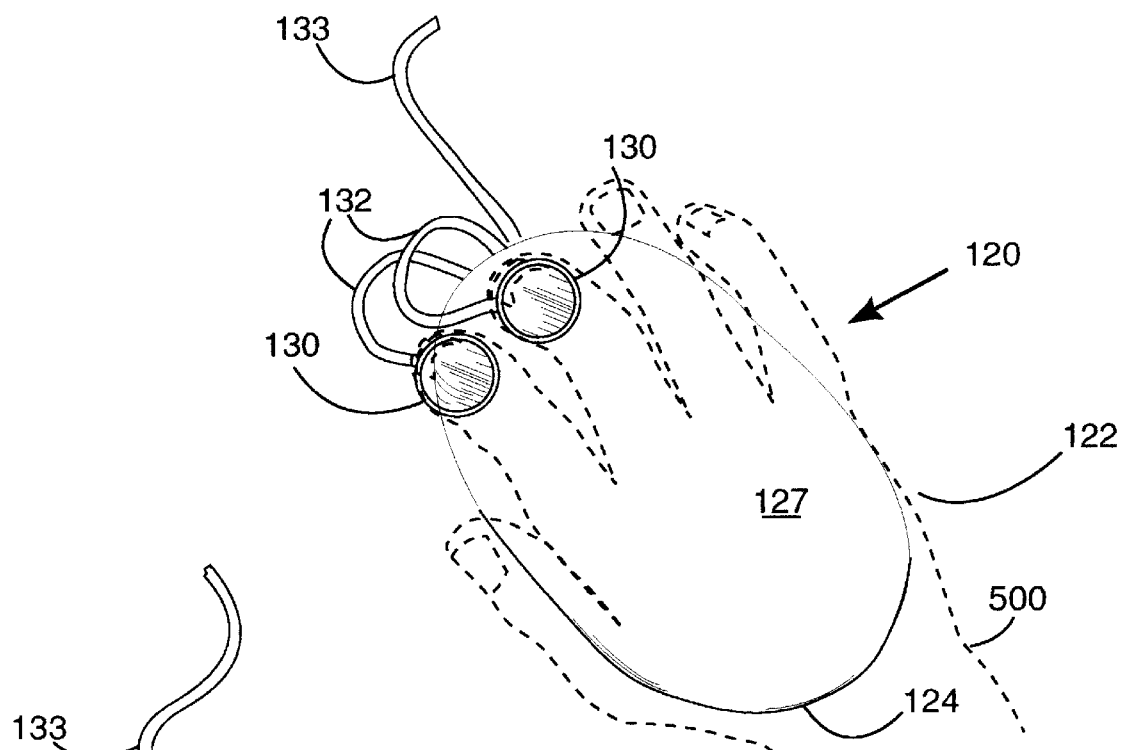
FIG. 11 is a perspective view of a computer pointing device having a firm body with at least one selectively positionable control button disposed upon the surface of the body in a first desired location.

FIG. 11 is a perspective view of a computer pointing device, generally designated as 120. Computer pointing device 120 has a conventional firm body 122, with at least one selectively positionable control button 130 disposed upon the outer surface 127 of the body 122 in a first desired location. In the shown embodiment two control buttons 130 are shown, however any number, such as three, could also be employed. As was the case with the moldable body 22 of FIGS. 3 and 4, control button 130 is selectively positionable by a user to any one of a virually unlimited plurality of desired locations upon the surface 127 of body 122. Computer pointing device 120 has a base 124 which is connected to body 122. Base 124 has electronic circuitry (not shown) which transmits motion information to a computer. A conductor 132 in the form of a wire connects control button 130 to the electronic circuitry, and a wire 133 connects the electronics of base 124 to a computer.

Control button 130 is selectively positionable by a user to any desired location upon surface 127 of body 122. Further, when a first control button 130 and a second control button 130 are disposed upon surface 127, the the relative position of the first control button 130 with respect to the second control button 130 is selectively adjustable by the user.

Figure 12:
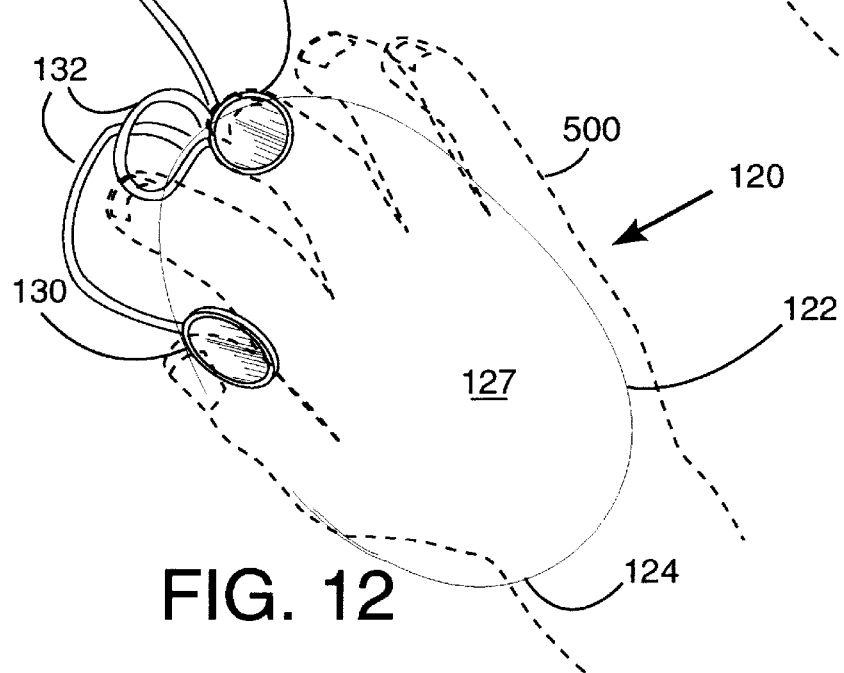
FIG. 12 is a perspective view of the computer pointing device of FIG. 11 with the control button moved to a second desired location upon the surface of the body.

Since control button(s) 130 is selectively positionable, it is possible to adapt the control button's 130 location so as to best fit the hand 500 and fingers of the user. A particularly useful feature of the present invention resides in the fact that control buttons 130 may be selectively positioned by the user so that they may be operated by any finger or even the thumb as shown in FIGS. 11 and 12. This is in sharp contrast to most conventional pointing devices wherein the mouse design essentially restricts control button operation to the index, middle, and perhaps fourth fingers. The control buttons 130 can also be repositioned upon the surface 127 to reduce biomechanical stress.

FIG. 12 is a perspective view of the computer pointing device of FIG. 11. At least one control button 130 has been moved by the user to new desired location upon the surface 127 of body 122. In the shown embodiment, both control buttons 130 have been moved. The moving process can be periodically repeated in order to relieve biomechanical stress associated with operation of the computer pointing device 120.

Figure 13:
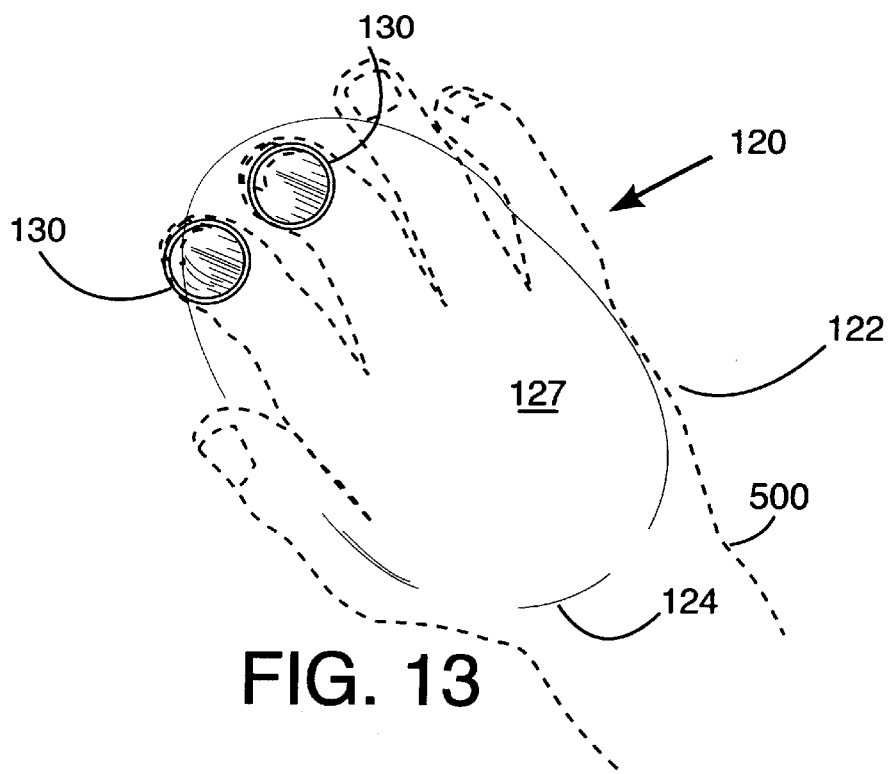
FIG. 13 is a perspective view of a computer pointing device wherein the control button communicates electromagnetically with the electronic circuitry; and, FIG. 14 is an enlarged edge view of a control button and firm body showing a hook and loop retaining means.

FIG. 13 is a perspective view of computer pointing device 120 wherein the control button 130 communicates electromagnetically with the electronic circuitry. That is, control button 130 is not directly connected to the electronic circuitry by a conductor, such as a wire, but rather is connected by an electromagnetic signal which is initiated by closure of control button 130. The electromagnetic signal is generated by circuitry in control button 130, and received by cooperating electronic circuitry in base 124. Such electromagnetic transmission circuitry is well known in the electronic art. It is further noted that as used herein, electromagnetic transmission can include any member of the frequency spectrum, and could even include transmissions in the sonic frequency range.

Figure 14:
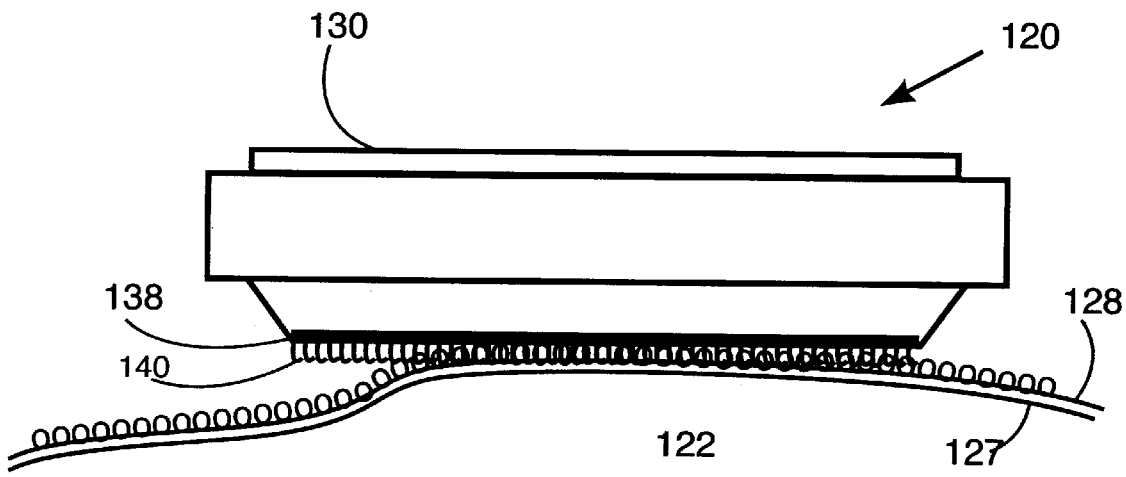

FIG. 14 is an enlarged edge view of a control button 130 and firm body 122 showing a hook and loop retaining means. The retaining means holds control button 130 in the desired location on surface 127 of body 130. The retaining means includes the surface 127 of body 122 having a first covering 128 having one of a plurality of loops 134 and a plurality of hooks 140 (hooks 140 in the shown embodiment). And, control button 130 having a bottom having a second covering 138 having the other of a plurality of loops 134 and a plurality of hooks 140. The hooks 140 engaging the loops 134 thereby holding control button 130 in the desired location on first covering 128.

Computer pointing device 120 is used as follows: A user selectively positions at least one control button 130 to a first desired location upon surface 127 of firm body 122 so as to best fit the hand 500 and fingers. After a time, and usually in order to relieve biomechanical stress, the user then selectively positions the at least one control button 130 to a second desired location upon the surface 127 of body 122.

The preferred embodiments of the invention described herein are exemplary and numerous modifications, dimensional variations, and rearrangements can be readily envisioned to achieve an equivalent result, all of which are intended to be embraced within the scope of the appended claims.

What is claimed is:

1. A computer pointing device, comprising:

a body having a surface;

at least one control button disposed at a first location upon said surface;

said at least one control button releasable from said first location and reattachable to a second location upon said surface; and, wherein said at least one control button is selectively positionable by a user to any desired location upon said surface.

2. A computer pointing device, comprising:

a body having a surface;

a first control button disposed at a first location upon said surface;

said first control button releasable from said first location and reattachable to a second location upon said surface;

a second control button disposed upon said surface; and, the relative position of said first control button with respect to said second control button selectively adjustable by a user.

3. A computer pointing device, comprising:

a body having a surface;

at least one control button disposed upon said surface;

said at least one control button selectively positionable to any one of a plurality of desired locations upon said surface;

a retaining means for holding said at least one control button in said desired location upon said surface; and, said retaining means includes said surface of said body having a first covering having one of a plurality of loops and a plurality of hooks, and said at least one control button having a bottom having a second covering having the other of a plurality of loops and a plurality of hooks, said hooks engaging said loops thereby holding said at least one control button in said desired position on said first covering.

4. A method for operating a computer pointing device, comprising:

providing a computer pointing device having a body having a surface, at least one control button disposable at a first location upon said surface, said at least one control button releasable from said first location and reattachable to a second location upon said surface; and, a user selectively positioning said at least one control button to said first location upon said surface of said body.

5. The method according to claim 4, further including:

the user selectively positioning said at least one control button to said second desired location upon said surface of said body.

* * * * *